United States Patent
Alyami (10) Patent No.: US 12,398,740 B1
(45) Date of Patent: Aug. 26, 2025

(54) METHODS AND SYSTEMS OF FAILURE PROTECTION FOR AUTOMATED VALVES

(71) Applicant: SAUDI ARABIAN OIL COMPANY, Dhahran (SA)

(72) Inventor: Mesfoh Awadh Hammed Alyami, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1 day.

(21) Appl. No.: 18/589,264

(22) Filed: Feb. 27, 2024

(51) Int. Cl.
| | |
|---|---|
| *F15B 19/00* | (2006.01) |
| *E21B 34/16* | (2006.01) |
| *F16K 37/00* | (2006.01) |
| *G05D 7/06* | (2006.01) |

(52) U.S. Cl.
CPC ........ *F15B 19/005* (2013.01); *F16K 37/0083* (2013.01); *E21B 34/16* (2013.01); *F16K 37/0066* (2013.01); *G05D 7/0652* (2013.01)

(58) Field of Classification Search
CPC ............... G05D 7/0652; G05D 7/0658; G05D 16/2046; F16K 37/0066; F16K 37/0083; F15B 19/005; Y10T 137/7761
USPC ...................................................... 137/487.5
See application file for complete search history.

(56) References Cited

U.S. PATENT DOCUMENTS

| | | | | |
|---|---|---|---|---|
| 5,197,328 | A * | 3/1993 | Fitzgerald ........... | F16K 37/0091 702/183 |
| 5,329,956 | A * | 7/1994 | Marriott ................. | F16K 17/04 251/30.01 |
| 5,558,115 | A * | 9/1996 | Lenz .................... | F16K 31/1262 137/86 |
| 6,176,247 | B1 * | 1/2001 | Winchcomb ............. | G05B 9/02 137/557 |
| 6,186,167 | B1 * | 2/2001 | Grumstrup .......... | F16K 37/0083 137/487.5 |
| 6,539,315 | B1 * | 3/2003 | Adams ..................... | G01F 1/383 73/861.58 |
| 6,920,409 | B2 * | 7/2005 | Essam .................. | F16K 37/0091 702/113 |
| 8,074,512 | B2 * | 12/2011 | Al-Buaijan ......... | F16K 37/0083 73/168 |
| 8,479,734 | B2 * | 7/2013 | Wood ................... | A61G 10/026 128/205.24 |

(Continued)

FOREIGN PATENT DOCUMENTS

CN  115552131 A  12/2022

*Primary Examiner* — William M McCalister
(74) *Attorney, Agent, or Firm* — Osha Bergman Watanabe & Burton LLP (57) ABSTRACT

A method includes detecting, by a control system, a feedback signal that indicates whether a network valve is open or closed/closing. Upon detecting the network valve is closed/closing, the method may include determining, by the control system, whether a closing command was issued, initiating a secondary valve system based on the determination of whether the closing command was issued. If the closing command was not issued, the method includes stopping control fluid flow from the primary supply system to the network valve and opening the secondary support valve so as to allow control fluid flow from the secondary supply system to the network valve, thereby maintaining the network valve open based on the control fluid flow from the secondary supply system. If the closing command was issued, the method includes closing the network valve.

20 Claims, 4 Drawing Sheets

(56) References Cited

U.S. PATENT DOCUMENTS

| | | | | |
|---|---|---|---|---|
| 8,579,252 B2 * | 11/2013 | Heer | ............... | F15B 20/002 251/73 |
| 8,684,021 B2 * | 4/2014 | Snowbarger | ........ | F16K 37/0091 137/12 |
| 8,996,328 B2 * | 3/2015 | Snowbarger | ....... | G05B 23/0256 700/282 |
| 9,335,762 B2 * | 5/2016 | Junk | ............ | G05B 23/0256 |
| 9,732,878 B2 * | 8/2017 | Alkandari | ............. | F16K 37/00 |
| 10,041,610 B2 * | 8/2018 | Junk | ............ | F15B 20/008 |
| 10,234,058 B2 * | 3/2019 | Junk | ............ | F16K 31/0627 |
| 11,739,772 B2 * | 8/2023 | Thornber | ............ | F15B 19/005 137/15.17 |
| 12,117,099 B2 | 10/2024 | Wagner-Stürz | ....... | F15B 20/008 |
| 2002/0108436 A1 * | 8/2002 | Albuaijan | ........... | F16K 37/0083 73/865.9 |
| 2003/0062494 A1 * | 4/2003 | Snowbarger | ............ | G05B 9/02 251/89 |
| 2006/0219299 A1 * | 10/2006 | Snowbarger | ........ | F16K 37/0091 137/487.5 |
| 2007/0018127 A1 * | 1/2007 | Seberger | ................ | G05B 9/02 251/129.04 |
| 2007/0183901 A1 * | 8/2007 | Chester | ................ | F15B 5/006 417/26 |
| 2010/0315069 A1 * | 12/2010 | Heer | ................ | F16K 37/0083 324/207.11 |
| 2011/0114191 A1 * | 5/2011 | Wheater | ............. | F16K 37/0091 137/12 |
| 2011/0252895 A1 * | 10/2011 | Kiesbauer | ........... | F16K 37/0091 73/862.583 |
| 2013/0000753 A1 * | 1/2013 | Penning | ............... | F15B 19/002 251/324 |
| 2014/0102549 A1 * | 4/2014 | Okuda | ................ | F15B 5/006 137/82 |
| 2016/0356396 A1 * | 12/2016 | Kah | ..................... | F15B 5/006 |
| 2017/0184215 A1 * | 6/2017 | Junk | ...................... | F15B 20/00 |
| 2017/0198829 A1 * | 7/2017 | Alkandari | ......... | F16K 37/0083 |

* cited by examiner

METHODS AND SYSTEMS OF FAILURE PROTECTION FOR AUTOMATED VALVES

BACKGROUND

Oil and gas production systems produce hydrocarbons and water from production wells. Production wells and systems have safety systems to isolate potential hazards while drilling and production operations. If potential hazards are not isolated and/or prevented, dangerous situations may arise that result in equipment damage and injury or death of people in the vicinity. The dangerous situations may also result in the release of production and operation fluids, such as oil, that may result in the contamination of the environment.

Occasionally, the safety systems may be triggered due to failure of components rather than triggering due to a hazardous situation. The unintended triggering of the safety systems can result in the loss of production due to downtime and the stopping of production operations. It takes time to start-up production operations, where production wells need time to ramp up to full production. Isolating hazards also puts stress on production and safety equipment to abruptly halt production operations and then start-up again that may result in equipment failure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a method of failure protection for automated valves of an isolation network including a control system, a network valve having a feedback device, a primary valve system, and a secondary valve system. The primary valve system includes a primary support valve and a primary supply system configured to supply control fluid to the primary support valve. The primary support valve may be used to control an opening/closing operation of the network valve. The secondary valve system includes a secondary support valve and a secondary supply system configured to supply control fluid to the secondary support valve. The secondary support valve may be used to control an opening/closing operation of the network valve. The primary support valve is operatively connected to the network valve, via the secondary support valve, such that the secondary support valve controls whether control fluid is supplied to the network valve from the primary supply system or the secondary supply system. The primary valve system and secondary valve system are operatively connected to the control system. The method may include detecting, by the control system, a feedback signal that indicates whether the network valve is open or closed/closing. Upon detecting the network valve is closed/closing, the method may include determining, by the control system, whether a closing command was issued. The method may include initiating the secondary valve system based on the determination of whether the closing command was issued. In some embodiments, if the closing command was issued, the method may include stopping control fluid flow from the primary supply system to the network valve. The method may include stopping control fluid flow from the secondary supply system to the network valve, thereby causing the feedback device to close the network valve. In some embodiments, if the closing command was not issued, the method may include stopping control fluid flow from the primary supply system to the network valve. The method may include opening the secondary support valve so as to allow control fluid flow from the secondary supply system to the network valve, thereby maintaining the network valve open based on the control fluid flow from the secondary supply system.

In some aspects, the techniques described herein relate to a system of failure protection for automated valves of an isolation network includes a control system, a network valve having a feedback device, a primary valve system, and a secondary valve system. The primary valve system includes a primary support valve, a primary supply system configured to supply control fluid to the primary support valve. The primary support valve may be used to control an opening/closing operation of the network valve. The secondary valve system includes a secondary support valve, a secondary supply system configured to supply control fluid to the secondary support valve. The secondary supply system may be used to control an opening/closing operation of the network valve. The primary support valve is operatively connected to the network valve, via the secondary support valve, such that the secondary support valve controls whether control fluid is supplied to the network valve from the primary supply system or the secondary supply system. The primary valve system and secondary valve system are operatively connected to the control system. The control system configured to detect a feedback signal that indicates whether the primary support valve is open or closed/closing. Upon detecting the primary support valve is closed/closing, the control system is configured to determine whether a closing command was issued. The control system is further configured to initiate the secondary valve system based on the determination of whether the closing command was issued. In some embodiments, if the closing command was issued, the control system is further configured to stop control fluid flow from the primary supply system to the network valve. The control system is further configured to stop control fluid flow from the secondary supply system to the network valve, thereby causing the feedback device to close the network valve. In some embodiments, if the closing command was not issued, the control system is further configured to stop control fluid flow from the primary supply system to the network valve. The control system is further configured to open the secondary support valve so as to allow control fluid flow from the secondary supply system to the network valve, thereby maintaining the network valve open based on the control fluid flow from the secondary supply system.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-4, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Disclosed herein are methods and systems of failure protection for automated valves of an isolation network. The present invention may include production systems with production wells configured to produce production fluids such as oil, condensate, gas, and/or water. Production systems may include gathering systems for the production fluids that may gather production fluids from many production wells. Production fluids may flow to a production plant for processing. The production plant may include safety systems such as isolation networks to isolate potential hazards during drilling and production operations. Isolation networks may operate utilizing valves and valve systems. Isolation networks may include valves configured to be automated such as automated isolation valves.

Figure 1:
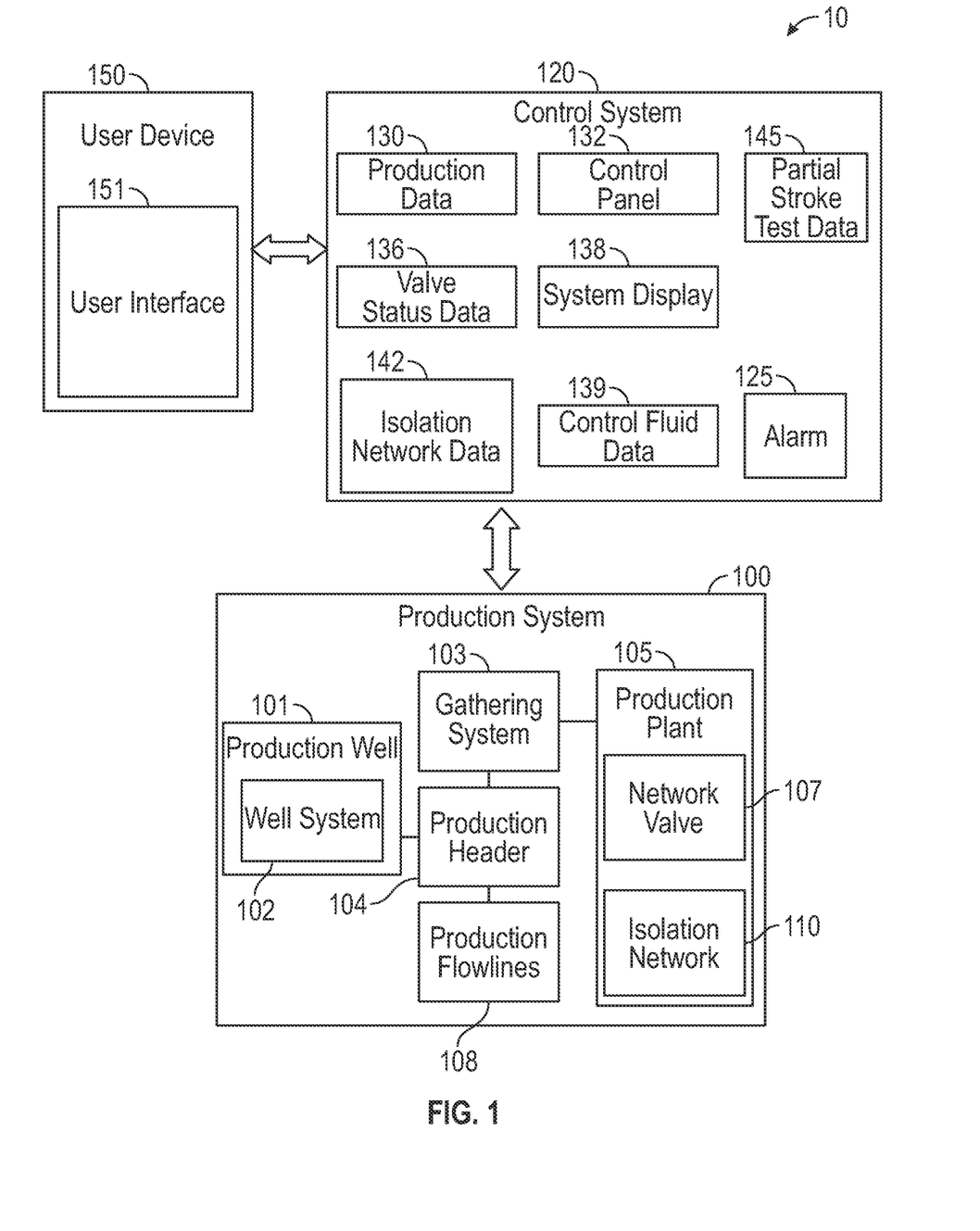
FIG. 1 depicts a production system in accordance with one or more embodiments.

FIG. 1 shows a schematic diagram in accordance with one or more embodiments. As shown in FIG. 1, a system of failure protection for automated valves of an isolation network (hereafter "failure protection system") (10) may include a production system (100), a user device (150), a control system (120), an isolation network (110) and various network elements (not shown). In some embodiments, the production system (100) may include a production well (101), a gathering system (103), and a production plant (105). In one or more embodiments, the control system (120) may be a production plant server. In some embodiments, various types of production data (130) are collected over the failure protection system (10). Likewise, the failure protection system (10) may also obtain valve status data (136) regarding one or more valves and valve systems throughout the failure protection system (10). The valve systems may be configured to utilize control fluids such as, but not limited to, air, gas, hydraulic fluid, or other fluids for operating. The failure protection system (10) may also obtain control fluid data (139) such as, but not limited to, pressure, temperature, and/or control fluid composition. Even though FIG. 1 shows only one isolation network, it will be obvious to one skilled in the art that the failure protection system may include more than one isolation network.

Furthermore, the production well (101) may include a well system (102) located in a well environment that includes a hydrocarbon reservoir ("reservoir") located in a subsurface hydrocarbon-bearing formation. The hydrocarbon-bearing formation may include a porous or fractured rock formation that resides underground, beneath the earth's surface ("surface"). In the case of the well system (102) being a hydrocarbon well, the reservoir may include a portion of the hydrocarbon-bearing formation. The hydrocarbon-bearing formation and the reservoir may include different layers of rock having varying characteristics, such as varying degrees of permeability, porosity, and resistivity. In the case of the well system (102) being operated as a hydrocarbon well, the well system (102) may facilitate the extraction of hydrocarbons (or "production") from the reservoir. In some embodiments, the well system (102) includes a wellbore, a well sub-surface system, a well surface system, and a well operating system. The wellbore may include a bored hole that extends from the surface into a target zone of the hydrocarbon-bearing formation, such as the reservoir. The wellbore may facilitate the circulation of drilling fluids during drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations). A well operating system in the well system (102) may control various operations of the well system (102), such as well production operations, well completion operations, well maintenance operations, and reservoir monitoring, assessment, and development operations. In some embodiments, the well operating system includes a computer system (400) that is the same as or similar to that of computer (402) described below in FIG. 4 and the accompanying description.

In some embodiments, one or more production wells are coupled to the gathering system (103). The gathering system (also referred to as a collecting system or gathering facility) (103) may include various hardware arrangements and pipe components that connect one or more production flowlines (108) from several production wells into a single gathering line. For example, a gathering system may include flowline networks, headers, pumping facilities, separators, emulsion treaters, compressors, dehydrators, tanks, valves, regulators, and/or associated equipment. In particular, a production header (104) may have production valves and testing valves to control a mixed stream for a flowline of a respective production well. Thus, a gathering system may direct various hydrocarbon fluids to a processing or testing facility, such as a production plant. In some embodiments, a gathering system manages individual fluid ratios (e.g., a particular gas-to-water ratio or condensate-to-gas ratio) as well as supply rates of oil, gas, and water. For example, a gathering system may assign a particular production value or ratio value to a particular production well by opening and closing selected valves among the production headers and using individual metering equipment or separators. Furthermore, a gathering system may be a radial system or a trunk line system. A radial system may bring various flowlines to a single central header. In contrast, a trunk-line system may use several production headers to collect oil and gas from fields that cover a large geographic area. Once collected, a gathering system may transport and control the flow of oil or gas to a storage facility, a production processing plant, or a shipping point.

Keeping with FIG. 1, production may be transported from one or more production wells to one or more production plants. More specifically, a production plant may refer to various types of industrial plants such as a production processing plant, a production cycling plant, or a compressor plant. A production processing plant (also referred to as a natural gas processing plant) may be a facility that processes natural gas to recover natural gas liquids (e.g., condensate, natural gasoline, and liquefied petroleum gas) and sometimes other substances such as sulfur. A production cycling plant may refer to an oilfield installation coupled to a gas-condensate reservoir. In particular, a production cycling plant may extract various liquids from natural gas. Consequently, the remaining dry gas may be compressed prior to returning to a producing formation, e.g., to maintain reservoir pressure. Moreover, various components of natural gas may be classified according to their vapor pressures, such as low-pressure liquid (i.e., condensate), intermediate pressure liquid (i.e., natural gasoline), and high-pressure liquid (i.e., liquefied petroleum gas). Examples of natural gas liquids include propane, butane, pentane, hexane, and heptane. With respect to compressor plants, a compressor plant may be a facility that includes multiple gas compressors, auxiliary treatment equipment, and pipeline installations for pumping natural gas over long distances. A compressor station may also repressurize gas in large gas pipelines or link offshore gas fields to their final terminals.

In some embodiments, the production plant (105) may include one or more pipe components, one or more storage facilities, and one or more control systems. For example, different forms of production fluids may be stored in various storage facilities that include surface containers as well as various underground reservoirs, such as depleted production fluid reservoirs, aquifer reservoirs, and salt cavern reservoirs. With respect to control systems, the control system (120) may include hardware and/or software that monitors and/or operates equipment, such as at a production well or in a production plant. Examples of control systems may include one or more of the following: an emergency shut down (ESD) system, a safety control system, a vibration monitoring system (VMS), process analyzers, other industrial systems, etc. In particular, the control system (120) may include a programmable logic controller that may control valve states, fluid levels, pipe pressures, warning alarms, pressure releases, and/or various hardware components for implementing a production flowline. Thus, a programmable logic controller may be a ruggedized computer system with functionality to withstand vibrations, extreme temperatures, wet conditions, and/or dusty conditions, such as those around a production plant, a production well, and/or a gathering system.

With respect to distributed control systems, a distributed control system may be a computer system for managing various processes at a facility using multiple control loops. As such, a distributed control system may include various autonomous controllers (such as remote terminal units (RTUs)) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, the control system (120) may be operatively connected to facility equipment of the production system (100). Facility equipment may include various machinery such as one or more hardware components, such as pipe components, refrigeration system components, and/or electrical system components, that may be monitored using one or more sensors. Examples of hardware components operatively connected to the control system (120) may include crude oil preheaters, heat exchangers, pumps, valves, compressors, loading racks, and storage tanks among various other types of hardware components. Hardware components may also include various network elements or control elements for implementing control systems, such as switches, sensors, routers, hubs, PLCs, remote terminal units, user equipment, or any other technical components for performing specialized processes. Examples of sensors may include pressure sensors, flow rate sensors, temperature sensors, torque sensors, rotary switches, limit feedback switches, electrical sensors, weight sensors, position sensors, microswitches, hydrophones, accelerometers, etc. Sensors may be configured to detect component malfunctions and are operatively connected to control systems. Control systems, user devices, and network elements may be computer systems similar to the computer system (400) described in FIG. 4 and the accompanying description.

In some embodiments, the control system (120) may include hardware and/or software for collecting data in real-time from various gas wells, gas plants, sensors coupled to hardware equipment and pipe components, user devices, and other systems (e.g., electrical, alarm) in the failure protection system (10). For example, the control system (120) may be one or more plant servers with functionality for obtaining data throughout the failure protection system (10), such as production data (130), valve system data (e.g., valve status data (136). For example, production data (130) may include operating upstream and downstream sensor data for various pipe components (e.g., pressure data, temperature measurements, and gas flow rates), and production flow rates from various pipeline information (PI) systems, such as control systems located throughout the failure protection system (10). Production data (130) may also include production fluid chemical composition data, such as condensate-gas ratio (CGR) data, and water sampling data (e.g., levels of Chloride and Strontium concentrations). Likewise, production data (130) may also include material and design specifications for various production components that form production flowlines, such as pipe component geometry and pipe component compositions. The control system (120) may also collect various production parameters regarding production plant operations, production well operations, and production header information regarding the gathering system (103) coupled to the production wells.

In some embodiments, the control system (120) may include a control panel (132) configured to control all the systems of the failure protection system (10). The control panel (132) may be operatively connected to all the systems of the production system (100) and one or more isolation networks. The control panel (132) may include hardware equipment and/or software for transmitting commands to the various systems. The control panel (132) may include a computer (402) as described in FIG. 4 and the accompanying description.

In some embodiments, the control system (120) includes functionality for determining and/or implementing one or more remediation operations based on valve statuses, and/or isolation network data (142). A remediation operation may include replacing a valve component that is part of a valve system based on the valve component failing to satisfy a predetermined criterion (e.g., integrity criteria, operational failure, etc.). Likewise, a remediation operation may also include adjusting production operations to manage integrity of the valve component. Likewise, a remediation operation may also include applying one or more maintenance operations to prevent future failure. In some embodiments, the control system (120) may automatically prioritize various remediation procedures among different valve components (e.g., limit feedback switches, diverters, pilot valves, solenoid valves, and supply valves) instantaneously based on future plant operations, and/or the integrity states of various production network components.

In some embodiments, the control system (120) may include a system display (138). The system display (138) is configured to display parameters and status of various systems within the production system (100). The system display (138) may be integrated into the control panel (132). The system display (138) includes hardware equipment and/or software for displaying parameters and status of various systems.

In some embodiments, the control system (120) may include a user interface (151). The user interface (151) may be integrated with the user device (150) or may be integrated with various components of the control system (120) such as the system display (138). The user device (150) may communicate with the control system (120) to present status reports to a particular user. Based on the status reports, the user device (150) may also manage various commands for performing one or more remediation operations based on one or more user selections. The user device (150) may be a personal computer, a handheld computer device such as a smartphone or personal digital assistant, or a human-machine interface (HMI). For example, a user may interact with the user interface (e.g., a graphical user interface) (151) to inquire regarding isolation network status and component integrity data in one or more valve system components at the production plant (105). Through user selections or automation, the control system (120) may identify network valves (e.g., automated isolation valves) (107) that closed unintentionally and implement remediation operations accordingly such as shutting down the production operations.

In some embodiments, the production system (100) may include an emergency shutdown system (ESD). The ESD is operatively connected to one or more network valves operatively connected to one or more production flowlines (108). The ESD may be any system capable of stopping the flow of production fluid in a production flowline by closing a network valve (107). The ESD may be controlled manually or automatically. The ESD may include a computer (e.g., computer system (400) further described in FIG. 4). The ESD may include one or more sensors disposed on the production flowline for measuring parameters such as pressure data, flowrate data, and temperature data. The ESD may monitor pressure differential across the network valve (107). In some embodiments, the ESD is used as a safety mechanism for emergency activation. For example, if pressure differential across the network valves, pilot valves, or other production system components exceeds a pre-set threshold, the ESD is triggered to stop flow of a production fluid. In other embodiments, if measured flow rate surpasses a preset limit, the ESD transmits an alarm. An alarm may alert an operator or user to take corrective action, such as shutting down the production fluid supply. The isolation network (110) may include a power-operated automated isolation valve (ZV) disposed in the production flowline. The ESD may be connected to the ZV. The ZV may be any valve capable of shutting down the production fluid supply via a programmable logic controller (PLC).

In some embodiments, an integrity assessment of one or more isolation network components is generated by the control system (120) upon obtaining a request from the user device (150) and using various predetermined criteria (e.g., isolation network data (142), production data (130), valve status data (136), and/or control fluid data (139)). Isolation network data (142) may include feedback signal data and/or component malfunction data (e.g., regulator malfunctions, solenoid valve malfunctions, feedback device malfunctions, diverter malfunctions, and/or supply valve malfunctions). The control system may be configured to detect malfunctions. Detecting malfunctions may include detecting a failure of control fluid flow to one or more network valves. Detecting malfunctions may also include using one or more sensors configured to detect malfunctions of components of the failure protection system. The failure of control fluid flow may include cessation of control fluid flow due to any component of the failure protection system malfunctioning. Detecting malfunctions may also include detecting the closing of one or more network valves. The request may be a network message transmitted between the user device (150) and the control system (120) that identifies a particular valve component, production system (100), or portion of the failure protection system (10) for an operational analysis. In some embodiments, the control system (120) includes functionality for transmitting signals and/or commands to one or more isolation networks to implement a particular remediation operation. For example, the control system (120) may transmit a network message over a machine-to-machine protocol to one or more isolation networks in the production plant (105). A command may be transmitted periodically, based on a user input, or automatically based on changes in production data (130) and/or valve status.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
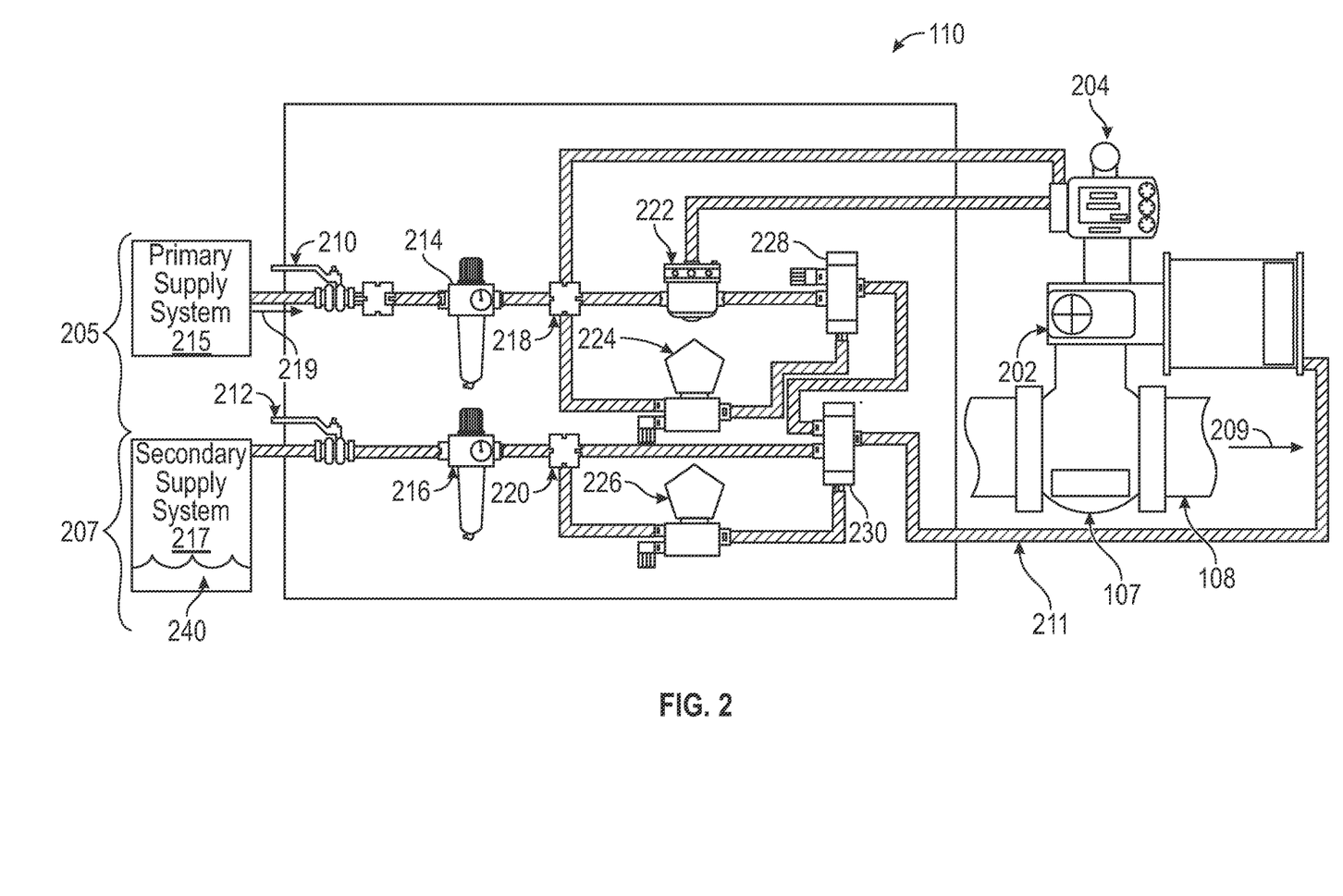
FIG. 2 depicts a valve system in accordance with one or more embodiments.

FIG. 2 shows the isolation network (110) in accordance with one or more embodiments. The isolation network (110) may include one or more network valves operatively connected to one or more production flowlines (108). The isolation network and components may be operatively connected to the control system (120). Each production flowline (108) being operatively connected to a network valve (107) may further be operatively connected to various systems within the production system (100) such as production wells, gathering systems, production headers, and/or production plants. The network valve (107) may be configured to stop/start the flow (209) of production fluids within each production flowline (108) or the production system (100). The network valve (107) includes an actuator that is operatively connected to the network valve (107) to at least stop/start the flow (209) of production fluid. The actuator may be manual or automated. The network valve (107) includes a closed position and an opened position. The network valve (107) may also be configured to have a partially opened position. The network valve (107) may include a positioning device (204). The positioning device (204) is configured to communicate a valve status (e.g., opened, closed, or partially opened) with the control system (120). The positioning device (204) may include a mechanical arm configured to determine the actuator positioning and a transducer configured to convert a mechanical arm position to an electrical signal. The transducer may be operatively connected to the control system (120). The positioning device (204) may be configured to open/close the network valve (107). The positioning device (204) may be operatively connected to the actuator for opening and closing the network valve (107).

In some embodiments, the network valve (107) may be configured to be automated. The network valve (107) may include hardware equipment for automating the opening and closing of the network valve (107). For example, the hardware equipment may include a feedback device (e.g., a limit feedback switch) (202). The feedback device (202) may be configured to actuate the actuator to close/open the network valve (107). The feedback device (202) may be configured to communicate one or more feedback signals (e.g., a limit feedback switch signal) with the control system (120) when the network valve (107) is opened or closed/closing. The feedback device (202) may be configured to transmit feedback signals to the control system (120). The feedback signal may indicate whether a valve is opened or closed/closing. The control system (120) is configured to detect the feedback signal. The control system (120) may be configured to compare the valve status with the feedback signal.

In one or more embodiments, the isolation network (110) includes one or more valve systems (i.e., a primary valve system (205) and/or a secondary valve system (207)). The isolation network (110) comprises a control fluid circulation system (211). The control fluid circulation system (211) may be configured to house control fluid (240) and is configured to allow a control fluid flow (219). The control fluid circulation system (211) comprises control fluid lines such as, but not limited to, pipes, tubes, hoses, and connecting components. The control fluid circulation system (211) is operatively connected to the components of the one or more isolation networks. Each of the valve systems (205, 207) may include one or more supply systems (i.e., a primary supply system (215) and/or a secondary supply system (217)). The isolation network (110) is configured to control the control fluid flow (219) through the control fluid circulation system (211) and components of the isolation network (110). Each of the supply systems (215, 217) may include hardware equipment to supply control fluid (240) to components of the isolation network (e.g., a support valve). For example, the hardware equipment of each supply system (215, 217) may include, but not limited to, supply valves, control fluid tanks, motors, compressors, pumps, tubes, and/or fittings. The hardware equipment of the supply system is operatively connected to the control fluid circulation system (211) and configured to allow the control fluid flow (219) therethrough. In some embodiments, the motors, compressors, and/or pumps may be powered by an operating medium such as electrical power, fluid power, mechanical power, and the like. The network valve (107) is operatively arranged in a closed loop of the control fluid circulation system (211) and is operatively connected with the hardware equipment of the one or more valve systems.

In accordance with one or more embodiments, each of the valve systems may include a supply valve (e.g., a primary supply valve (210) and/or a secondary supply valve (212)). The supply valve is configured to stop/start control fluid flow (219) from the supply system to the control fluid circulation system (211) and other components of the valve system. The supply valve may be a ball valve, a gate valve, a plug valve, butterfly valve, globe valve, and the like. An inlet of the supply valve is operatively connected to an outlet of the control fluid tank of the supply system.

In accordance with one or more embodiments, each valve system (205, 207) may include a regulator (e.g., a primary regulator (214) and/or a secondary regulator (216)) and/or one or more volume boosters. The regulator is configured to regulate the control fluid flow (219) from the supply system to the rest of the valve system. The regulator may be operatively connected to an outlet of the supply valve. In some embodiments, the valve system may include one or more diverters (e.g., a primary diverter (218) and/or a secondary diverter (220)). A diverter is configured to receive the control fluid flow (219) from the regulator or supply system and divert the control fluid flow (219) into one or more divergent streams of control fluid flow (219). In some embodiments, one divergent stream of the control fluid flow (219) may be diverted to the positioning device (204). Another divergent stream of the control fluid flow (219) may be diverted to a volume booster (222). The volume booster (222) may be configured to increase the control fluid flow (219) into one or more support valves. The volume booster (222) may be operatively connected to the outlet of the regulator or supply system. The volume booster (222) may also be operatively connected to the outlet of the positioning device. The volume booster (222) may combine the divergent streams of control fluid to increase the control fluid flow (219) into one or more support valves.

In accordance with one or more embodiments, each of the valve systems (205, 207) may include a solenoid valve (e.g., a primary solenoid valve (224) and/or a secondary solenoid valve (226)). The inlet of the solenoid valve may be operatively connected to the diverter, the regulator, or the supply system. The solenoid valve may be configured to provide a control fluid input signal to the one or more support valves.

The solenoid valve may be operatively connected to the control system (120). The solenoid valve may be configured to receive signals from the control system (120) to control an opening/closing operation of the one or more support valves, thereby opening/closing or maintaining a current positioning (e.g., opened or closed) of the network valve (107) based on the control fluid flow (219) from a supply system (e.g., the primary supply system (215) or the secondary supply system (217)).

In accordance with one or more embodiments, each of the valve systems (205, 207) may include one or more support valves (e.g., a primary support valve (228) and/or a secondary support valve (230)). The support valve may be operatively connected to the outlet of the volume booster, the regulator, or the supply system. The support valve is used to control an opening/closing operation of the network valve (107). The support valve may have one or more inlets (e.g., a pilot inlet and/or a main inlet) and one or more internal valves (e.g., a pilot valve and/or a main valve). The pilot inlet may be operatively connected to an outlet of the solenoid valve. The pilot inlet receives the control fluid input signal from the solenoid valve to actuate the pilot valve. The main inlet of the support valve may be operatively connected to the outlet of one of the volume booster, the diverter, the regulator, or the supply system. The main inlet is configured to receive the control fluid flow (219). The control fluid flow (219) the pilot inlet opens the main valve to allow control fluid flow (219) therethrough. The control fluid input signal may include control fluid flow (219) into the pilot inlet.

In some embodiments, an outlet of the primary support valve (228) may be operatively connected to the main inlet of the secondary support valve (230). The outlet of the secondary support valve may be operatively connected to an inlet of the network valve (107). The control system (120) is configured to selectively actuate the actuator of the network valve (107).

Further, in one or more embodiments, the control system (120) may include an alarm (125). The alarm (125) is configured to provide notifications to operators. The alarm (125) may be a digital alarm that sends notification to the user device (150) such as a mobile device. The alarm (125) may be a sound device that emits sound notifications. The notifications may be audible and/or visual alarms. The notifications may be operational actions such as initiating the secondary valve system (207) if the network valve (107) is closed/closing and a closing command has not been issued. The alarm (125) is operatively connected to the control system (120). The alarm (125) is configured to receive commands from the control system (120).

In accordance with one or more embodiments, the control system (120) may include a power supply. The power supply may receive an input voltage of, for example, 110 or 220 VAC (volts alternating current) at 60 Hz (Hertz) of utility power. The power supply is configured to deliver electrical power to the components of the failure protection system (10).

Figure 4:
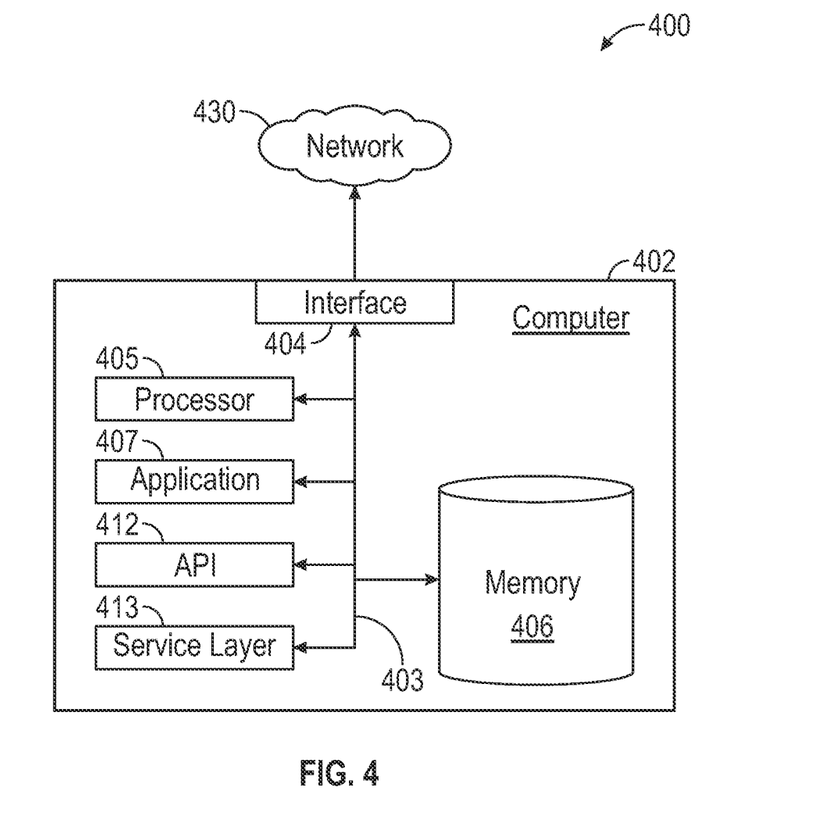
FIG. 4 depicts a computer system in accordance with one or more embodiments.

In accordance with one or more embodiments, the control system (120) may also include a computer system (400) that is the same as or similar to that of computer (402) described below in FIG. 4 and the accompanying description. The computer system (400) may include the user interface (151) and the system display (138). The computer system (400) is configured to monitor one or more sensors, for example, the valve status. The computer system (400) is also configured to send/receive one or more signals to/from components of the isolation network, for example, the network valve (107).

The computer system (400) is also configured to initiate and/or terminate the alarm (125). The computer system (400) is operatively connected to the control system (120). The computer system (400) may be electrically connected to the power supply, or the computer system (400) may include an internal battery.

One or more computer-readable media associated with the control system (120) may also include computer-executable instructions (a program) configured to collect, store, parse, and analyze the operational data of the control system (120). The program may be configured to perform operations consistent with embodiments of the present disclosure, for example, determine current state variables of the failure protection system (10), adjust various operating characteristics based on determined values, etc. The program may further arithmetically calculate revised state variables that seek output state goals, such as for example, mathematically seeking target values associated with variables of the system in response to feedback from a workflow in cooperation with systems and methods of the present disclosure.

In accordance with one or more embodiments, the control system (120) may include a control panel (132). The control panel (132) is electrically connected to the power supply. The control panel (132) may have a power switch. The control panel (132) may have a panel interface and a panel display. The control panel (132) is configured to monitor one or more sensors. The control panel (132) is configured to send/receive one or more signals to/from components, for example, the one or more support valves. The control panel (132) is also configured to initiate and/or terminate the alarm (125). The control panel (132) is operatively connected to the control system (120).

In accordance with one or more embodiments, the failure protection system (10) may be configured to perform a partial stroke test. The partial stroke test may be initiated from a partial stroke command from a user. The partial stroke command may be entered using the user interface (151). The control system (120) may be configured to detect a partial stroke command from a user. The control system (120) may be configured to transmit control commands to control devices (e.g., positioning devices, solenoid valves) to close, at least partially, the network valve (107) to perform the partial stroke test. The partial stroke test may be used to test the network valve (107) functionality without fully closing the network valve (107). The partial stroke test may test that the network valve (107) will close when a command is issued. The control system (120) may be configured to obtain partial stroke test data (145) to ascertain whether the network valve (107) is functioning properly.

Figure 3:
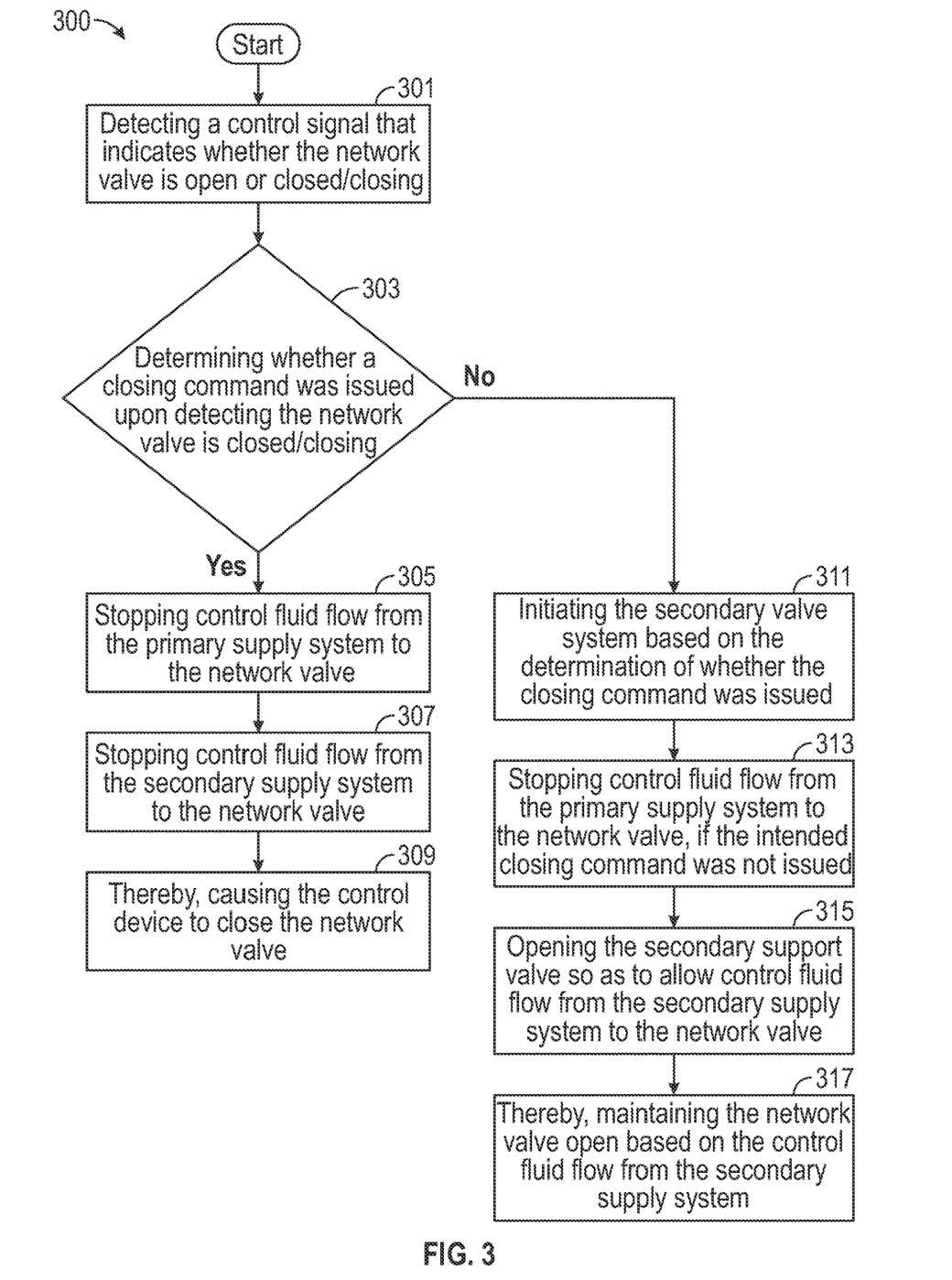
FIG. 3 depicts a flowchart for a method in accordance with one or more embodiments.

FIG. 3 depicts a flowchart in accordance with one or more embodiments describing a method of failure protection for automated valves of an isolation network (hereafter "failure protection method") (300). Although the steps in flowchart using the failure protection method are shown in sequential order, it will be apparent to one of ordinary skill in the art that some steps may be conducted in parallel, in a different order than shown, or may be omitted without departing form the scope of the invention.

In accordance with one or more embodiments, the isolation network (110) may include the control system (120), the network valve (107) having the feedback device (202), the primary valve system (205), and the secondary valve system (207). The primary valve system (205) may include the primary support valve (228) and the primary supply system (215) configured to supply control fluid (240) to the primary support valve (228), which is used to control an opening/closing operation of the network valve (107). The secondary valve system (207) may include the secondary support valve (230) and the secondary supply system (217) configured to supply control fluid (240) to the secondary support valve (230), which is used to control an opening/closing operation of the network valve (107). The primary support valve (228) is operatively connected to the network valve (107), via the secondary support valve (230), such that the secondary support valve (230) controls whether control fluid (240) is supplied to the network valve (107) from the primary supply system (215) or the secondary supply system (217). The primary valve system (205) and secondary valve system (207) are operatively connected to the control system (120).

In step (301), the failure protection method (300) may include detecting, using the control system (120), a feedback signal (e.g., the limit feedback switch signal) that indicates whether the network valve (107) is opened/opening or closed/closing, in accordance with one or more embodiments. The feedback signal may be transmitted from the feedback device (e.g., the limit feedback switch) (202) to the control system (120). The control system (120) may be configured to detect the feedback signal that indicates whether the network valve (107) is opened/opening or closed/closing.

In step (303), the failure protection method (300) may include determining, by the control system (120), whether a closing command was issued upon detecting the network valve (107) is closed/closing, in accordance with one or more embodiments. The control system (120) is configured to determine whether the closing command was issued upon detecting the network valve (107) is closed/closing.

In step (305), the failure protection method (300) may include stopping the control fluid flow (219) from the primary supply system (215) to the network valve (107), if the closing command was issued. The control system (120) is configured to stop the control fluid flow (219) from the primary supply system (215) to the network valve (107), if the closing command was issued.

In step (307), the failure protection method may include stopping control fluid flow (219) from the secondary supply system (217) to the network valve (107). The control system (120) is configured to stop the control fluid flow (219) from the secondary supply system (217) to the network valve (107), if the closing command was issued.

In step (309), the failure protection method may include causing the feedback device (e.g., the limit feedback switch) (202) to close the network valve (107). The control system (120) is configured to cause the control devices ( ) to close the network valve (107). In some embodiments, stopping control fluid flow (219) from the secondary supply system (217) to the network valve (107), may thereby cause the feedback device (202) to close the network valve (107).

In step (311), the failure protection method (300) may include initiating the secondary valve system (207) based on the determination of whether the closing command was issued, in accordance with one or more embodiments. The control system (120) is configured to initiate the secondary valve system (207) based on the determined of whether the closing command was issued. In some embodiments, the secondary valve system (207) is initiated, if the determination is that the closing command was not issued. In some embodiments, the secondary valve system (207) may have been initialized before the determination of whether the closing command was issued.

In step (313), the failure protection method (300) may include stopping control fluid flow (219) from the primary supply system (215) to the network valve (107), if the closing command was not issued, in accordance with one or more embodiments. The control system (120) is configured to stop the control fluid flow (219) from the primary supply system (215) to the network valve (107), if the closing command was not issued.

In step (315), the failure protection method (300) may include opening the secondary support valve (230) so as to allow control fluid flow (219) from the secondary supply system (217) to the network valve (107), if the closing command was not issued, in accordance with one or more embodiments. The control system (120) is configured to open the secondary support valve (230) so as to allow control fluid flow (219) from the secondary supply system (217) to the network valve (107), if the closing command was not issued. In some embodiments, opening the secondary support valve (230) may include receiving an opening command from the control system (120) and/or other support valve control devices. In some embodiments, opening the secondary support valve (230) may include receiving control fluid flow (219) through the pilot inlet of the secondary support valve (230) from the secondary solenoid valve (226).

In step (317), the failure protection method (300) may include maintaining the network valve (107) open based on the control fluid flow (219) from the secondary supply system (217), if the closing command was not issued. The control system (120) is configured to maintain the network valve (107) open based on the control fluid flow (219) from the secondary supply system (217). Maintaining the network valve (107) opened allows for normal production operations and production fluid to flow through the production flowline. In some embodiments, opening the secondary support valve (230) so as to allow control fluid flow (219) from the secondary supply system (217) to the network valve (107) may thereby maintain the network valve (107) open based on the control fluid flow (219) from the secondary supply system (217).

In accordance with one or more embodiments, the failure protection method may include determining, by the control system (120), whether the network valve (107) is opened/opening. The network valve (107) may be fully opened for normal operations. The network valve (107) may be opening after initialization of the one or more valve systems and/or the production system (100). The network valve (107) may also be opened after completing a partial stroke test where the network valve (107) was at least partially closed in order to perform the partial stroke test. The failure protection method may also include allowing, by the control system (120), control fluid flow (219) from the primary supply to flow to the network valve (107) by way of the primary support valve (228) and the secondary support valve (230) if the network valve (107) is determined to be opened/opening. The control system (120) is configured to determine whether the network valve (107) is opened/opening. The control system (120) may also be configured to allow control fluid flow (219) from the primary supply to flow to the network valve (107) by way of the primary support valve (228) and the secondary support valve (230) if the network valve (107) is opened/opening.

In accordance with one or more embodiments, the failure protection method (300) may include detecting a lost feedback signal from the limit feedback switch. Detecting a lost feedback signal may include detecting that the feedback signal (e.g., the limit feedback switch signal) has stopped transmitting from the feedback device (e.g., the limit feedback switch) (202). The control system (120) may be configured to detect the lost feedback signal from the feedback device (202). The failure protection method may include detecting the lost feedback signal for a pre-determined time interval (e.g., two seconds). After the pre-determined time interval expires, the failure protection method may include determining, by the control system (120), that the closing command was not issued. The control system (120) may be configured to determine that the closing command was not issued after the pre-determined time interval has expired.

In accordance with one or more embodiments, the failure protection method may include regulating, using the regulator (e.g., the primary regulator (214) and/or the secondary regulator (216)), control fluid flow (219) from the primary supply system (215) to the primary support valve (228). In some embodiments, the failure protection method may include detecting, by the control system (120), a regulator malfunction (e.g., a primary regulator malfunction and/or a secondary regulator malfunction). The failure protection method may include determining, by the control system (120), that the closing command was not issued.

In accordance with one or more embodiments, the failure protection method may include supplying the control fluid input signal, using the solenoid valve (e.g., primary solenoid valve (224) and/or the secondary solenoid valve (226)), to primary support valve (228). In some embodiments, the failure protection method may include detecting, by the control system (120), a solenoid valve malfunction (e.g., a primary solenoid valve malfunction and/or the secondary solenoid valve malfunction). The failure protection method may include determining, by the control system (120), that the closing command was not issued. The control system (120) may be configured to detect a solenoid valve malfunction. The control system (120) may also be configured to determine that the closing command was not issued.

In accordance with one or more embodiments, the primary valve system (205) may include the primary supply valve (210) operatively connected to the primary supply system and the primary support valve (228). The primary supply valve (210) may be configured to stop the control fluid flow (219) to the primary support valve (228). The failure protection method may include detecting, by the control system (120), a primary supply valve malfunction. The failure protection method may include determining, by the control system (120), that the closing command was not issued. The control system (120) may be configured to detect the primary supply valve malfunction. The control system (120) may also be configured to determine that the closing command was not issued.

In accordance with one or more embodiments, the failure protection method may include detecting a partial stroke command from a user. Using the control system (120), the failure protection method may also include closing, at least partially, the network valve (107) to perform a partial stroke test once a partial stroke command is detected. The failure protection method may also include performing, using the control system (120), a partial stroke test. The control system (120) is configured to detect the partial stroke command from the user to perform a partial stroke test. The control system (120) may also be configured to close, at least partially, the network valve (107) to perform a partial stroke test once the partial stroke command is detected. The control system (120) may also be configured to perform the partial stroke test. The partial stroke test may include opening the network valve (107) upon determining that the network valve (107) is functioning properly.

In accordance with one or more embodiments, the failure control method may include allowing, using the control system (120), flow from the secondary supply system (217) to the network valve (107) to prevent closing of the network valve (107) due to system malfunction, where closing of the network valve (107) includes stopping flow (209) of production fluids causing loss of production.

An example of the computer system (400) is described with reference to FIG. 4, in accordance with one or more embodiments. FIG. 4 is a block diagram of a computer system (400) used to provide computational functionalities associated with described algorithms, methods, functions, processes, flows, and procedures as described in the instant disclosure, according to an implementation. The illustrated computer (402) in the computer system (400) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of the computer system (400) for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any, or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413)). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer (413). Software services, such as those provided by the service layer (413), provide reusable, defined business functionalities through a defined interface. For example, the interface may be software written in JAVA, C++, Python, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that may be connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that may be connected to the network (430). For example, memory (406) can be a database storing data consistent with this disclosure. In one example, memory (406) may store programs or algorithms for controlling operation of the control system (120) or the operation of the one or more isolation networks described above in accordance with one or more embodiments with reference to FIGS. 1-3. For example, the programs or algorithms may control operation of the isolation networks described with reference to FIG. 2. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, the application (407) can serve as one or more components, modules, applications, etc. In one example, the application (407) may include programs or algorithms for controlling operation of the control system (120) or each of the isolation networks described above in accordance with one or more embodiments with reference to FIGS. 1-3. For example, the programs or algorithms may control operation of control systems described with reference to FIG. 1 in accordance with one or more embodiments. Further, although illustrated as a single application (407), the application (407) may be implemented as multiple applications (407) on the computer (402). In addition, although illustrated as integral to the computer (402), in alternative implementations, the application (407) can be external to the computer (402). In one example, the method described with reference to FIG. 4 may be implemented by the application (407).

There may be any number of computers (402) associated with, or external to, the computer system (400) containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402). Furthermore, in one or more embodiments, the computer (402) is a non-transitory computer readable medium (CRM).

Embodiments of the present disclosure may provide at least one of the following advantages. The present invention includes allowing, using the control system (120), flow from the secondary supply system (217) to the network valve (107) to prevent closing of the network valve (107) due to system malfunction. The closing of the network valve (107) may include stopping production flow causing loss of production. The loss of production may cause a loss of revenue. The stopping and the restarting of production flow may result in stress being placed on the production system (100) causing equipment failure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of failure protection for automated valves of an isolation network comprising a control system, a network valve having a control device, a primary valve system, and a secondary valve system,
    wherein the primary valve system comprises a primary support valve and a primary supply system configured to supply control fluid to the primary support valve, which is used to control an opening/closing operation of the network valve,
    wherein the secondary valve system comprises a secondary support valve and a secondary supply system configured to supply control fluid to the secondary support valve, which is used to control an opening/closing operation of the network valve,
    wherein the primary support valve is operatively connected to the network valve, via the secondary support valve, such that the secondary support valve controls whether control fluid is supplied to the network valve from the primary supply system or the secondary supply system, wherein the primary valve system and secondary valve system are operatively connected to the control system, and the method comprising:

detecting, by the control system, a feedback signal that indicates whether the network valve is open or closed/closing;

upon detecting the network valve is closed/closing, determining, by the control system, whether a closing command was issued;

initiating the secondary valve system based on the determination of whether the closing command was issued, wherein if the closing command was issued:
stopping control fluid flow from the primary supply system to the network valve, and
stopping control fluid flow from the secondary supply system to the network valve,
thereby closing or maintaining closed the network valve;

wherein if the closing command was not issued:
stopping control fluid flow from the primary supply system to the network valve, and
opening the secondary support valve so as to allow control fluid flow from the secondary supply system to the network valve,
thereby opening the network valve based on the control fluid flow from the secondary supply system.

2. The method of claim 1, further comprising:
determining, by the control system, whether the network valve is opened/opening; and
allowing, by the control system, control fluid flow from the primary supply system to flow to the network valve by way of the primary support valve and the secondary support valve if the network valve is opened/opening.

3. The method of claim 1, further comprises,
wherein the feedback device is a limit feedback switch,
detecting, by the control system, a lost feedback signal from the limit feedback switch,
wherein the lost feedback signal has been detected for a predetermined time interval; and
determining, by the control system, that the closing command was not issued.

4. The method of claim 3, wherein the predetermined time interval comprises two seconds.

5. The method of claim 1, further comprises,
wherein the primary valve system further comprises a primary regulator,
regulating, using the primary regulator, control fluid flow from the primary supply system to the primary support valve;
detecting, by the control system, a primary regulator malfunction; and
determining, by the control system, that the closing command was not issued.

6. The method of claim 1, further comprises,
wherein the primary valve system further comprises a primary solenoid valve operatively connected to the primary supply system and the primary support valve,
supplying a primary control fluid input signal, using the primary solenoid valve, to the primary support valve;
detecting, by the control system, a primary solenoid valve malfunction; and
determining, by the control system, that the closing command was not issued.

7. The method of claim 1, further comprises,
wherein the primary valve system further comprises a primary supply valve operatively connected to the primary supply system and the primary support valve,
wherein the primary supply valve is configured to stop the control fluid flow to the primary support valve,
detecting, by the control system, primary supply valve malfunction; and
determining, by the control system, that the closing command was not issued.

8. The method of claim 1, further comprises,
using the control system,
detecting a partial stroke command from a user;
closing, at least partially, the network valve to perform a partial stroke test; and
performing a partial stroke test.

9. The method of claim 1, wherein allowing, using the control system, flow from the secondary supply system to the network valve to prevent closing of the network valve due to system malfunction,
wherein closing of the network valve comprises stopping production flow causing loss of production.

10. The method of claim 1, wherein the network valve comprises an automated isolation valve.

11. A system of failure protection for automated valves of an isolation network comprises:
a control system, a network valve having a feedback device, a primary valve system, and a secondary valve system;

the primary valve system comprises:
a primary support valve,
a primary supply system configured to supply control fluid to the primary support valve, which is used to control an opening/closing operation of the network valve;

the secondary valve system comprises:
a secondary support valve,
a secondary supply system configured to supply control fluid to the secondary support valve, which is used to control an opening/closing operation of the network valve, wherein the primary support valve is operatively connected to the network valve, via the secondary support valve, such that the secondary support valve controls whether control fluid is supplied to the network valve from the primary supply system or the secondary supply system, wherein the primary valve system and secondary valve system are operatively connected to the control system, and the control system configured to:
detect a feedback signal that indicates whether the primary support valve is open or closed/closing;
upon detecting the primary support valve is closed/closing, determine whether a closing command was issued;
initiate the secondary valve system based on the determination of whether the closing command was issued,
wherein if the closing command was issued:
stop control fluid flow from the primary supply system to the network valve, and
stop control fluid flow from the secondary supply system to the network valve,
thereby closing or maintaining closed the network valve;

wherein if the closing command was not issued:
stop control fluid flow from the primary supply system to the network valve, and
open the secondary support valve so as to allow control fluid flow from the secondary supply system to the network valve,
thereby opening the network valve based on the control fluid flow from the secondary supply system.

12. The system of claim 11,
wherein the control system is further configured to:
determine whether the network valve is opened/opening; and
allow control fluid flow from the primary supply system to flow to the network valve by way of the primary support valve and the secondary support valve if the network valve is opened/opening.

13. The system of claim 11,
wherein the feedback device comprises a limit feedback switch,
wherein the control system is further configured to:
detect a lost feedback signal from the limit feedback switch,
wherein the lost feedback signal has been detected for a predetermined time interval; and
determine that the closing command was not issued.

14. The system of claim 13, wherein the predetermined time interval comprises two seconds.

15. The system of claim 11,
wherein the primary valve system further comprises a primary supply valve operatively connected to the primary supply system and the primary support valve,
wherein the primary supply valve is configured to stop the control fluid flow to the primary support valve,
wherein the control system is further configured to:
detect a primary regulator malfunction; and
determine that the closing command was not issued.

16. The system of claim 11,
wherein the primary valve system further comprises a primary solenoid valve configured to provide control fluid input signal to the primary support valve;
wherein the primary solenoid valve is operatively connected to the primary supply system and the primary support valve,
the control system further configured to:
detect a primary solenoid valve malfunction; and
determine that the closing command was not issued.

17. The system of claim 11,
wherein the primary valve system further comprises a primary supply valve configured to flow primary flow, by the primary supply valve, to the primary supply system;
the control system further configured to:
detect, by the control system, primary supply valve malfunction; and
determine that the closing command was not issued.

18. The system of claim 11, further comprises,
the control system is further configured to:
detect a partial stroke command from a user;
close, at least partially, the network valve to perform a partial stroke test; and
perform a partial stroke test.

19. The system of claim 11,
wherein the control system is further configured to:
allow flow from the secondary supply system to the network valve to prevent closing of the network valve due to system malfunction,
wherein closing of the network valve comprises stopping production flow causing loss of production.

20. The system of claim 11, wherein the network valve comprises an automated isolation valve.

* * * * *